2,771,464
Patented Nov. 20, 1956

2,771,464
NOVEL SIZING AGENTS FOR PAPER

Randall Hastings, Stamford, Erhart K. Drechsel, Springdale, and Edward Strazdins, Stamford, Conn., assignors to American Cyanamid Company, New York, N. Y., a corporation of Maine No Drawing. Application June 3, 1953,
Serial No. 359,445

11 Claims. (Cl. 260—101)

The present invention relates to the manufacture of novel fortifying agents useful for enhancing the effect of rosin size in the manufacture of sized paper. More particularly, the present invention relates to the manufacture of fortifying agents from rosin, maleic anhydride, and citric acid or the dehydration products thereof. The invention includes the manufacture of the fortifying agents in dry and liquid form, and dry and liquid rosin sizes fortified by a content thereof.

It is known that rosin may be reacted with up to one mol of maleic anhydride or with known equivalents by the Diels-Alder reaction to form a reaction product (hereinafter termed "maleated rosin") which, when saponified with an aqueous alkali, acts as an adjuvant or "fortifier" for ordinary rosin size. The presence of a minor proportion of saponified maleated rosin in ordinary rosin size permits formation of sized paper having superior resistance to penetration by water and other liquids as compared with the resistance imparted to the paper by the presence of an equal weight of either of the two materials alone.

Commercially the saponification of rosin to form rosin size is performed in "cook tanks" holding roughly 10,000 gallons, of caustic lye or soda ash solution, and it is not practical to equip these tanks with agitators sufficiently intensive to cut or break up any lumps of rosin which may form during the saponification. Commercial grades of rosin, which have softening points of 65°–75° C., are readily and completely saponified by this method provided care is taken that the temperature of the caustic solution is well above the softening point of the rosin. It is a practical necessity, therefore that when any rosin derivative is saponified in such equipment the derivative must be a very soft gum or liquid at the saponification temperatures employed so that product of the cooking will be a homogeneous solution free from lumps. The presence of lumps in sizing solution causes paper prepared therefrom to have a mottled appearance and cannot be tolerated.

Maleated rosins which have softening points below 80° C., as determined by the capillary tube method, are readily saponified at atmospheric pressure, and 85° C. is taken as representative of the maximum softening point which a maleated rosin may have and yet be saponifiable at atmospheric pressure in present-day industrial equipment. For commercially acceptable results, the temperature of the caustic saponifying solution must be at least 15° C. above the softening point of the material to be saponified.

When rosin is reacted with up to 7% of its weight of maleic anhydride, as by heating a mixture of the two materials at 160°–170° C. for 7 hours, the maleated rosin obtained has a low softening point and can be readily formed into a homogeneous sizing solution by saponification with hot aqueous caustic solution at atmospheric pressure at temperatures below the boil. This weight corresponds to 0.21 mol of maleic anhydride per mol of rosin.

Low softening point rosin-maleic anhydride products may also be prepared by mixing rosin with even as much as 1 mol of maleic anhydride and heating the mixture so as to cause only a part of the maleic anhydride to react, the remainder being present in dissolved state in the rosin. The presence of only a small amount of unreacted dissolved maleic anhydride causes a sharp depression in the softening point of the product, making it suitable for saponification at atmospheric pressure, but confers no other advantage.

Rosin may also be reacted with more than 7% of its weight of maleic anhydride, the products thus obtained being increasingly difficult to saponify even when sufficient alkali is used to form a completely neutralized fortified size. Such maleated rosins have softening points so high that when cooked with aqueous caustic as close to the boil as control of foaming will permit, they form large solid masses only the surfaces of which are saponified. As a practical matter, maleated rosins containing more than 10%–15% of combined maleic anhydride by weight, based on the weight of the rosin depending on the type of rosin employed, can be saponified only by cooking with aqueous caustic solution in a pressure autoclave at temperatures well in excess of 100° C. When completely maleated rosin sizes are saponified, caustic solution temperatures of 140° C. or more are required necessitating correspondingly high autoclave pressures.

Rosin size is manufactured industrially in very large quantities and the cost of autoclave equipment large enough to accommodate the quantities involved, together with the heat requirements thereof, constitute a serious disadvantage in the manufacture of maleated rosin size by this method.

From the foregoing it will be seen that need for pressure saponification has heretofore generally been obviated by two methods. One method is based on the presence of a substantial amount of unreacted maleic anhydride. The other consists in only partially maleating the rosin, that is, by maleating the rosin with less than about 7% of its weight of maleic anhydride, equivalent to only 0.21 mol of maleic anhydride per mol of rosin. In such event, however, not more than about 21% of the rosin undergoes the reaction, the remainder (about 79%) passing through the reaction substantially unchanged. Thus when proceeding according to the first method there is waste of maleic anhydride, and when proceeding according to the second there is waste of heat, labor and equipment.

The discovery has now been made that excellent fortifying agents may be prepared without significant waste and without use of pressure equipment by reacting rosin, maleic anhydride or the equivalent, and dehydrated citric acid in molar ratio between about 10:8.5:1.5 and 10:5:5 respectively to yield Diels-Alder condensates having softening points between about 85° C.–70° C., and cooking the condensates at atmospheric pressure with an aqueous alkali metal alkali solution having a temperature at least 15° C. higher than the softening point of the respective condensates obtained.

We have found that the fortifying agents thus prepared may be mixed with liquid rosin size and that the mixture so prepared is a fortified size having substantially the same sizing effectiveness as rosin size which has been fortified in the same manner with maleated rosin.

We have further found that both the fortifying agents and the fortified rosin sizes of the present invention may be dried in customary manner to yield respectively dry fortifying agents and dry fortified rosin sizes of excellent quality.

The fortified sizes of the present invention are homogeneous blends consisting essentially of a minor proportion of the aforementioned fortifying adduct and a major proportion of rosin, the sizes being at least partially neutralized with an alkali metal base. The fortifying action of the saponified adduct is at its peak when somewhat less than half is present based on the total weight of the fortified size. Best results in terms of sizing efficiency are generally obtained when the ratio by weight of the fortifying agent to the rosin size is between about 1:2 and 1:4.

From the foregoing it will thus be seen that the principal feature of the present invention is the reaction of rosin with maleic anhydride or the equivalent and dehydrated citric acid in proportions to form a Diels-Alder adduct having a softening point less than 85° C., the respective molar ratios of the reagents being between about 10:8.5:1.5 and 10:5:5, and saponifying the adduct at atmospheric pressure with hot aqueous alkali metal alkali solution having a temperature at least 15° C. higher than the softening point of the adduct.

In addition to producing a fully efficient adduct which can be saponified at atmospheric pressure thereby eliminating need for autoclave equipment, the present invention possesses other important advantages.

In the first place the adduct itself may be prepared in an open vessel and no high pressure reaction equipment or other particular form of reactor is necessary.

Then, substantially all of the rosin undergoes reaction with the maleic anhydride and the citric acid, permitting important savings in fuel while greatly increasing the effective throughput of the equipment. Substantially none of the materials are wasted or fail to react.

The invention has the further advantage of extending the usefulness of citric acid. It has been proposed in the past to form sizes from rosin and citric acid in 1:1 molar ratio followed by saponification, but upon actual trial it has been found that citric acid is an undesirable material when used in this proportion for this purpose for the following reasons.

In the first place, citric acid is a saturated acid and before it can undergo a Diels-Alder reaction with rosin it must be dehydrated or dehydroxylated to form a compound containing a —C=C— linkage. While rosin undergoes the Diels-Alder reaction with maleic anhydride at 160° C., dehydration of citric acid begins at the higher temperature of about 175° C. This dehydration is strongly endothermic, absorbing much heat.

Moreover, citric acid is usually supplied commercially as the monohydrate, and removal of this water of crystallization requires a further substantial amount of heat.

A particular reason militating against the use of citric acid is that fortified sizes prepared from rosin and citric acid are much less efficient as paper sizes than their counterparts prepared from rosin and maleic anhydride.

According to the invention the beneficial effect of citric acid in depressing the softening point of the fortifying adduct is fully employed while the effect of its disadvantageous properties upon the efficiency of the product is minimized. The amount of citric acid used is only that sufficient to form a Diels-Alder condensate having a softening point of 85° C.–70° C. In other words, only sufficient citric acid is used to depress the softening point of the adduct sufficiently to permit saponification at atmospheric pressure, and no more is used than is necessary to produce this effect.

As the result of careful experiments, we have found that at one extreme the molar ratio of maleic anhydride to citric acid should be about 8.5:1.5, the molar amount of the citric acid thus being about ⅙ of that of the maleic anhydride, this proportion yielding an adduct having a softening point of about 85° C. At the other extreme we have found that when 1 mol of citric acid is used per mol of maleic anhydride, the softening point of the condensate is less than 70° C. and that the disadvantages associated with the use of citric acid commence to outweigh the benefits.

We have further found that the disadvantages associated with the use of citric acid are minimized while a fortified sizing adduct is obtained of negligibly impaired effectiveness by employing rosin, maleic anhydride, and citric acid in the molar ratio of about 10:8:2.

From the ratios given above it will be noted that regardless of the respective amounts of maleic anhydride and citric acid used, the molar ratio of the two materials taken together totals about 1 mol per mol of rosin. This ratio affords the most efficient use of the rosin. In commercial practice, however, it is often preferable to employ a slight excess of rosin, for example 10%–20%. This excess rosin passes through the reaction substantially unchanged, but insures that substantially none of the more valuable materials fail to react.

The adduct may be prepared by a number of different procedures, all essentially equivalent and each thus constituting a different aspect of the invention.

According to one procedure, the rosin, maleic anhydride and citric acid are charged into a vessel and heated to about 175°–220° C. until the citric dehydrates, the reaction being completed in the range of about 160°–220° C., and preferably below 200° C. The course of the reaction may be followed by ordinary analytical procedures for the determination of free maleic anhydride, but is usually complete in 7 hours at the lower temperature, in 2 hours at 200° C. It is immaterial whether the citric acid is added before, with, or after the maleic anhydride.

We have found that considerable savings in heat can be effected by another procedure, in which the heat developed by the reaction of the maleic anhydride with rosin is used to supply the heat necessary for the dehydration of the citric acid. This method is particularly useful when the proportion of rosin, maleic anhydride, and citric acid is in the molar ratio of 10:8:2. According to this method, the rosin is first heated to about 160° C. and the maleic anhydride is then added rapidly. An exothermic reaction takes place, usually carrying the temperature up to about 205° C. The citric acid is added at this point and rapid dehydration of the citric acid takes place. The reaction may then be completed at 160° C.

According to still another procedure, the citric acid is first heated at 175°–200° C. until dehydration takes place. The product is then used in place of the citric acid as described, thus making it possible to manufacture the adduct at a temperature less than 175° C.

A variety of equivalents may be employed for the materials referred to in the specification and the examples which follow.

Any of the commercially available rosins may be employed for the manufacture of the fortifying agents and the fortified sizes of the present invention. We have found that of these, however, gum rosin contains the largest proportion of constituents which react readily with maleic anhydride and the dehydration products of citric acid, this material yielding at lower temperatures and in a shorter time an agent having superior fortifying action. For these reasons we prefer to use gum rosin as the raw material for the manufacture of the fortifying agent itself. Gum rosin may be employed as the main constituent of the size but we prefer to use wood rosin or tall oil rosin for the reason that the latter rosins, which are usually partially disproportionated, have reduced tendency to crystallize when present in liquid form and are more resistant to oxidation when made into dry size.

In place of maleic anhydride, maleic and fumaric acids may equally advantageously be used. Maleic anhydride is preferred because of the comparative ease with which it reacts.

In place of the citric acid there may be employed, as stated, the products obtained by dehydrating citric acid at between about 175° C.–200° C. The dehydration products thus obtained are principally itaconic, citraconic acid, aconitic acid and their anhydrides. The use of this mixture is not necessary, and any one of the aforementioned dehydration products may be employed alone or in admixture with another with substantially the same results. In the specification and the claims, therefore, the term "dehydrated citric acid" is used for brevity to designate one or more of the aforementioned dehydration products of citric acid.

The softening points referred to in the specification and the claims are those determined by the standard capillary tube method, wherein the adduct is finely crushed, a trace of oil insoluble dye such as Helmerco Green BGC added, the powder placed in a capillary tube, and the tube is placed in a hot water bath. In making the determination the softening point is taken as occurring at the temperature where the white powder begins to melt and to form droplets of colored liquid.

Saponification of the adducts of the present invention may be performed by any of the methods normally employed for saponifying ordinary rosin. For example, the reaction mixture may be flowed with hot caustic solution into a conventional cook tank, or the caustic solution may be stirred into the reaction product in the reaction vessel itself.

Neither the amount nor the strength of the alkali metal alkali solution employed for the saponification constitutes a feature of the present invention and will be varied to conform to the requirements established by paper manufacturers. In commercial practice, liquid fortified liquid rosin sizing solution is supplied as a product which is neutralized only partially, that is, to the extent of at least 50% and usually about 70% to 80%, containing 50%–80% solids. Dry fortified rosin size, however, is ordinarily supplied in the form of a substantially completely neutralized product, experience having taught that rosin sizes which are incompletely neutralized are difficult to dry and, when dried to a powder tend to lose their free-flowing characteristics on storage. It is therefore preferred that the respective products of the present invention be adjusted to conform to commercial practice as stated.

Accordingly, when dry size is manufactured, both the fortifying adduct and the rosin may be cooked separately with sufficient alkali to yield a fully neutralized product, and the two saponified products blended. Alternatively, the adduct and the rosin may be cooked together with a substantially full equivalent of alkali. The products are spray- or drum-dried. In the manufacture of liquid fortified rosin size similar methods of saponification may be employed using less alkali. The precise saponification method employed is not a feature of the present invention, and numerous variations may be employed, as will be apparent to the man skilled in the art.

It will be understood that both the dry and liquid sizes of the present invention may and often advantageously will contain a few percent of auxiliary materials often present in rosin sizes. For example, in the case of liquid sizes a few percent of a lower alkanol may be present to decrease the viscosity thereof. In the case of dry sizes there may be present the usual anti-oxidants and foam suppressors.

As saponifying agents any alkali metal alkali may be used including sodium hydroxide, sodium bicarbonate and sodium carbonate. The corresponding potassium salts may also be used, and these give somewhat better results when the saponified product is to be used as a foaming agent in the manufacture of gypsum board.

The fortified sizes of the present invention find their principal use in the manufacture of sized paper by the beater addition process. In this process a stock of paper-making cellulosic fibers is formed at a consistency of about 0.5% to about 4% and to this is added a dilute solution of the size containing between about ¼% and 4% solids based on the dry weight of the fibers. Sufficient alum is then added to precipitate the size, typically 1 to 1.5 times the weight of the size, after which the fibers are sheeted and dried to form paper.

The invention has been completely disclosed above. The following examples illustrate specific embodiments of the invention and are not to be construed as limitations thereon. Parts are by weight unless otherwise stated.

EXAMPLES 1–9

A comparative series of adducts from M-gum rosin, maleic anhydride and citric acid was prepared to illustrate the effect of varying the maleic anhydride:citric acid ratio on the softening point of the resulting condensates.

The adducts of Examples 1–9 were prepared by placing the reagents shown in Table I in a flask equipped with take-off condenser, and stirrer, heating the mixture to 195°–200° C. in 30 minutes, and maintaining the mixture in that temperature range for two hours thereafter. The resulting adducts were cooled on stainless steel trays and their softening points determined by the capillary tube method.

The adducts of Examples 3–9 were saponified at atmospheric pressure, by melting 500 gm. of the adduct in a similar flask and adding a solution of 140 gm. of 95.5% NaOH in 400 ml. of water at 90° C. This amount of caustic was sufficient for substantially complete neutralization. The mixtures were cooked with slow stiring just below the boil (95°–100° C.) for two hours, and saponification proceeded substantially as in the case of ordinary rosin. Hot water was then added to adjust the solids content to 50% and the mixtures cooked a further 30 minutes. Homogeneous fortifying agents were obtained which were free from lumps.

The adducts of Examples 1 and 2, when treated with sodium hydroxide solution in the same manner, formed lumpy masses, only the surfaces of which were saponified. These adducts were successfully saponified by transferring the mixtures to a laboratory autoclave and cooking at 140°–150° C. for the same length of time.

Results are as follows. In judging the ease of saponification, ordinary M-gum rosin was taken as the standard.

*Table I*

SPONIFICATION OF ADDUCTS

| Ex. | Mols | | | Soft. Point, °C.[1] | Saponification at 95°–100° C. |
|---|---|---|---|---|---|
| | Rosin | Maleic Anh. | Citric | | |
| 1 | 10 | 10 | Nil | 113 | Lumpy mass; outside saponified.[2] |
| 2 | 10 | 8.7 | 1.3 | 90 | Do.[2] |
| 3 | 10 | 8.5 | 1.5 | 84 | Satisfactory, but slower than rosin. |
| 4 | 10 | 8 | 2 | 75 | Equal to rosin. |
| 5 | 10 | 7.5 | 2.5 | 73 | Do. |
| 6 | 10 | 5 | 5 | 70 | Do. |
| 7 | 10 | 4 | 6 | <70 | Do. |
| 8 | 10 | 2 | 8 | <70 | Do. |
| 9 | 10 | Nil | 10 | <70 | Do. |

[1] Of adduct, by capillary tube method.
[2] Saponification completed in a laboratory autoclave.

This table shows that adducts in which the molar ratio of combined maleic anhydride to combined citric acid is in excess of about 8.5:1.5 cannot be saponified successfully at atmospheric pressure.

The fortifying agents thus prepared were blended with varying amounts of commercial liquid gum rosin size to form a series of fortified sizes which were tested according to standard laboratory procedure using bleached 60% sulfite-40% soda pulp, the fortified sizes being diluted to 5% solids before use with water. The fortified sizes thus prepared were very similar in effectiveness to corresponding rosin sizes fortified by maleated rosin. The handsheets were tested for their water and lactic acid resistance by the Currier and penescope methods with the following representative results.

Table II

EFFECT OF VARYING AMOUNT OF FORTIFYING AGENT

| Fortified Size, Parts [1] | | Percent Added [2] (Solids Basis) | $H_2O$ Resist. (Sec.) (Currier) [3] | Lactic Acid Resist. (Sec.) (Penescope) |
|---|---|---|---|---|
| Fortifier | Rosin | | | |
| 1 | 1 | 2 | 53 | 220 |
| 1 | 2 | 2 | 57 | 350 |
| 1 | 3 | 2 | 60 | 460 |
| 1 | 4 | 2 | 58 | 400 |
| 1 | 5 | 2 | 56 | 310 |
| 1 | 6 | 2 | 55 | 300 |

[1] Solids basis. Fortifier was product of Example 4.
[2] Based on dry weight of the pulp.
[3] Slack scale.

This table demonstrates that in the case of similar fortifying agents, even a minor proportion of the fortifying agent causes a distinct improvement, and that best sizing results are obtained when the ratio of fortifying agent to the rosin size is between about 1:2 and 1:4.

Each of the saponified fortifying agents prepared as shown in Table I was mixed with liquid commercial gum rosin size in the weight ratio of 1:3 (solids basis) to form another series of fortified sizes which were tested in the same manner as the sizes of Table II. Representative results are as follows.

Table III

EFFECT OF VARYING MALEIC ANHYDRIDE:CITRIC ACID RATIO

| Mols | | | Softening Point, °C. | $H_2O$ Resist. (Sec.) (Currier) | Lactic Acid Resist. (Sec.) (Penescope) |
|---|---|---|---|---|---|
| Rosin | Maleic Anh. | Citric | | | |
| 10 | 10 | Nil | 113 | 62 | 480 |
| 10 | 8.7 | 1.3 | 90 | 62 | 475 |
| 10 | 8.5 | 1.5 | 84 | 61 | 470 |
| 10 | 8 | 2 | 75 | 60 | 460 |
| 10 | 7.5 | 2.5 | 73 | 60 | 440 |
| 10 | 5 | 5 | 70 | 59 | 430 |
| 10 | 4 | 6 | <70 | 57 | 385 |
| 10 | 2 | 8 | <70 | 56 | 350 |
| 10 | Nil | 10 | <70 | 55 | 325 |

The table shows that when the ratio of maleic anhydride to citric acid is between about 8.5:1.5 and 5:5, readily saponifiable adducts are formed having sizing efficiencies substantially the same as fully maleated rosin, the best combination of results occurring when the ratio is about 8:2. The table further shows that when the ratio of maleic anhydride to citric acid is less than 5:5, water and lactic acid resistance values decrease substantially without substantial offsetting advantage.

EXAMPLE 10

1,000 gm. of adduct corresponding to the adduct of Example 4, prepared by condensation of 10 mols of gum rosin with 8 mols of maleic anhydride and 2 mols of citric acid, was melted. To this was added a solution of 280 gm. of 95.5% NaOH in 800 ml. of water at 90° C. The mixture was cooked with slow stirring just below the boil at 95°–100° C. for two hours, yielding a substantially completely neutralized fortifying agent. Half of this solution was dried on a laboratory drum drier supplied with steam at 70 lb. Dry fortifying agent was obtained in the form of a free-flowing powder.

To the remaining half of the solution at 70° C. was added with stirring 1430 gm. of tall oil rosin heated to 160° C. The rosin had been disproportionated to $[\alpha]_D+32$ specific rotation by heating at 300° C. for ½ hour in the presence of 0.25% phenothiazine. An excellent grade of fortified high free rosin size resulted, containing about 72% of free rosin equivalent based on 28% neutralization.

To this was added 185 gm. of $Na_2CO_3$ in 3000 ml. of water. The mixture was cooked for 3 hours just below the boil at 95°–100° C. yielding a substantially fully neutralized fortified rosin size containing the adduct and rosin in the weight ratio of 1:3. The solution was drum dried as described yielding a dry free flowing homogeneous fortified size of excellent commercial grade.

EXAMPLE 11

The following illustrates the preparation of fortifying adducts of the present invention containing a 10% excess of rosin utilizing to advantage the heat developed by the rosin-maleic anhydride reaction.

3322 gm. of melted M-gum rosin (10 mols plus 10% excess) was flowed into a steam jacketed kettle equipped with stirrer and thermometer and heated to 160° C. To this was rapidly added 785 gm. of maleic anhydride (8 mols) with stirring. The temperature dropped slightly and then quickly rose to 205° C. At this point 420 gm. of citric acid monohydrate (2 mols) was added. Foam developed resulting from dehydration of the citric acid. The temperature of the reaction mixture dropped gradually to 160° C. The mixture was maintained at 160° C.–165° C. for 7 hours, when reaction was substantially complete. The resulting Diels-Alder adduct containing about 302 g. of unreacted rosin was saponified at atmospheric pressure by cooking for 1½ hours with 780 gm. of NaOH dissolved in 5300 gm. of water at 94°–97° C. The product was a 75% neutralized fortifying size containing about 50% solids. The product was mixed with three parts (solids basis) of 75% neutralized wood rosin size containing 70% solids. An excellent grade of liquid fortified size was obtained.

We claim:

1. A fortifying agent for rosin size, consisting essentially of the Diels-Alder reaction product of (a) rosin, (b) a material selected from the group consisting of maleic anhydride, maleic acid, and fumaric acid, and (c) dehydrated citric acid in molar ratio between about 10:8.5:1.5 and about 10:5:5 respectively, said agent being at least partly neutralized with an alkali metal alkali said dehydrated citric acid corresponding to the product obtained by heating citric acid at a temperature between about 175° C. and 200° C.

2. A fortifying agent according to claim 1 wherein the molar ratio is about 10:8:2.

3. A fortified size consisting essentially of a minor proportion of the Diels-Alder reaction product of (a) rosin, (b) a material selected from the group consisting of maleic anhydride, maleic acid, and fumaric acid; and (c) dehydrated citric acid in molar ratio between about 10:8.5:1.5 and 10:5:5 respectively, and a major proportion of rosin, said reaction product and said rosin being at least partly neutralized with an alkali metal alkali said dehydrated citric acid corresponding to the product obtained by heating citric acid at a temperature between about 175° C. and 200° C.

4. A liquid fortified size according to claim 3 wherein the molar ratio is about 10:8:2.

5. A liquid fortified size according to claim 3 wherein the weight ratio of said reaction product to said rosin is about 1:3.

6. A fortified size consisting essentially one part by weight of the Diels-Alder reaction product of gum rosin, maleic anhydride and dehydrated citric acid in molar ratio of about 10:8:2 respectively and 2 to 4 parts by weight of a partially disproportionated rosin, said reaction product and said rosin being at least partly neutralized with an alkali metal alkali said dehydrated citric acid corresponding to the product obtained by heating citric acid at a temperature between about 175° C. and 200° C.

7. A process for manufacturing a fortifying agent for rosin size which comprises forming a Diels-Alder reaction product from (a) rosin, (b) a material selected from the group consisting of maleic anhydride, maleic acid, and fumaric acid, and (c) dehydrated citric acid in molar ratio between about 10:8.5:1.5 and 10:5:5 respectively, and at least partly neutralizing said reaction product at atmospheric pressure with aqueous alkali metal alkali solution having a temperature at least 15° C. higher than the capillary tube softening point of said reaction product said dehydrated citric acid corresponding to the product obtained by heating citric acid at a temperature between about 175° C. and 200° C.

8. A process according to claim 7 wherein the molar ratio is about 10:8:2.

9. A process for manufacturing a fortified rosin size which comprises forming a Diels-Alder reaction product from (a) rosin, (b) a material selected from the group consisting of maleic anhydride, maleic acid and fumaric acid, and (c) dehydrated citric acid in molar ratio between about 10:8.5:1.5 and 10:5:5 respectively, and at least partly neutralizing said reaction product and a greater weight of a rosin at atmospheric pressure with aqueous alkali metal alkali solution having a temperature at least 15° C. more than the capillary tube softening point of said reaction product said dehydrated citric acid corresponding to the product obtained by heating citric acid at a temperature between about 175° C. and 200° C.

10. A process according to claim 8 wherein the weight of the rosin is about three times the weight of said reaction product.

11. A process for manufacturing a fortifying agent for rosin size from rosin, maleic anhydride and citric acid in molar ratio of about 10:8:2 respectively which comprises heating said rosin to about 160° C., adding said maleic anhydride thereby causing an exothermic action to take place carrying the temperature of the reaction mixture to about 175°–200° C., adding said citric acid while maintaining the temperature of the reaction mixture between about 175°–200° C. until substantially all of said citric acid has dehydrated, continuing the reaction at a temperature of about 160° C. until substantially all of said maleic anhydride and said dehydrated citric acid have reacted with said rosin, and at least partially neutralizing the reaction product at atmospheric pressure with aqueous alkali metal alkali having a temperature at least 15° C. more than the softening point of said reaction product.

References Cited in the file of this patent

UNITED STATES PATENTS

| | | |
|---|---|---|
| 2,039,243 | Krzikalla et al. | Apr. 28, 1936 |
| 2,081,889 | Borglin | May 25, 1937 |
| 2,121,183 | Binapfl | June 21, 1938 |
| 2,440,242 | Auer | Apr. 27, 1948 |
| 2,517,563 | Harris | Aug. 8, 1950 |
| 2,628,918 | Wilson et al. | Feb. 17, 1953 |

OTHER REFERENCES

Richter: Textbook of Org. Chem., 1st ed. (1938) p. 336, John Wiley and Sons, New York, N. Y.